United States Patent [19]

Goedken

[11] 4,439,072
[45] Mar. 27, 1984

[54] FLUIDIZED BED DISCHARGE BIN WITH AERATING BLOWER

[75] Inventor: James H. Goedken, Beatrice, Nebr.
[73] Assignee: Hoover Universal, Inc., Ann Arbor, Mich.
[21] Appl. No.: 266,032
[22] Filed: May 22, 1981
[51] Int. Cl.³ ............................................. B65G 53/38
[52] U.S. Cl. ........................................ 406/91; 406/90
[58] Field of Search .......................... 406/90, 91, 138; 222/195

[56] References Cited

U.S. PATENT DOCUMENTS

| | | | |
|---|---|---|---|
| 3,253,750 | 5/1966 | Paton | 406/90 |
| 3,438,682 | 4/1969 | Mohrhusen | 406/138 X |
| 3,659,752 | 5/1972 | Carney, Jr. et al. | 406/90 |
| 4,353,668 | 10/1982 | Anderson | 406/90 |

FOREIGN PATENT DOCUMENTS 1286748 1/1962 France .
1370650 7/1964 France .

Primary Examiner—Jeffrey V. Nase
Attorney, Agent, or Firm—Stephenson and Boller

[57] ABSTRACT

A fluidized bed discharge bin comprises a removable closure covering an opening in the bottom of the bin. The interior surface of the closure is covered by an air-permeable sheet whose outer perimeter is held between the bin opening and the closure. Spacing means are disposed on the surface of the closure to space at least a portion of the air-permeable sheet from the closure. Aerating fluid is introduced into the bin via an inlet in the closure which is located in close proximity to the location where the spacing means is spacing the air-permeable sheet from the interior surface of the closure. The aerating blower system includes a control for supplying aerating fluid to the bin in the form of successive aerating pulses and provision is made for causing an initial surge of pressure to be imparted to the beginning of each aerating pulse which is greater than the nominal aerating pressure. Plural embodiments of the invention are disclosed.

4 Claims, 8 Drawing Figures

FLUIDIZED BED DISCHARGE BIN WITH AERATING BLOWER

BACKGROUND AND SUMMARY OF THE INVENTION

The present invention relates to fluidized bed discharge bins wherein aerating fluid is introduced into the bin to fluidize the contents of the bed for discharge.

Bulk materials such as particulates or powders are often transported in large bins. When the contents of the bins are put to use it becomes necessary to discharge them from the bin. Various techniques and apparatus are used for emptying the contents of bins, and one known technique involves the introduction of aerating fluid to fluidize the particulate or powdered material into a fluid stream which enables the contents of the bin to be satisfactorily discharged. An example of one type of fluidized bed discharge system is disclosed in U.S. Pat. No. 3,777,775 dated Dec. 7, 1973.

The present invention is directed to a new and improved fluidized bed discharge system with aerating blower which provides important advantages and benefits over prior types of systems. One advantage of the present invention is that powders and particulates can be discharged through comparatively small openings which are inexpensive and more easily sealed than are larger openings. This means that the system is less susceptible to leakage of such materials to the surrounding environment and atmosphere. Accordingly it is possible to use this type of bin for toxic or carcinogenic powders or particulates with reduced risk of leakage to the environment.

Another advantage is that an improved fluidizing capability is obtained which avoids a problem known as "rat-holing". One way of fluidizing powdered or particulate material is to introduce the aerating fluid on one side of an air-permeable member such as a fabric sheet on which the particulate material is disposed. Rat-holing involves a situation where an air path is developed through the particulate material to the top of the bin which relieves the pressure on the air-permeable sheet thereby precluding the formation of fluidized bulk material in the bin. With the present invention the tendency of a fluidized bed discharge bin to form a rat-hole may be considerably minimized. This improved performance is believed attributable to the construction, arrangement and manner of operation of the aerating fluid supply to the bin and the aerating mechanism on the bin, both individually and collectively.

While the invention possesses the advantage of improved sealing during discharge, as explained above, it also renders the interior of the bin readily accessible for other procedures such as maintenance or cleaning.

Still another advantage of the invention is that it may be used conveniently with any of a variety of discharge variations.

The foregoing features, advantages and benefits of the invention, along with additional ones, will be seen in the ensuing description and claims which should be considered in conjunction with the accompanying drawings wherein like reference numerals designate like parts. The drawings disclose preferred embodiments of the invention in accordance with the best mode presently contemplated in carrying out the invention.

DESCRIPTION OF THE PREFERRED EMBODIMENTS

Figure 1:
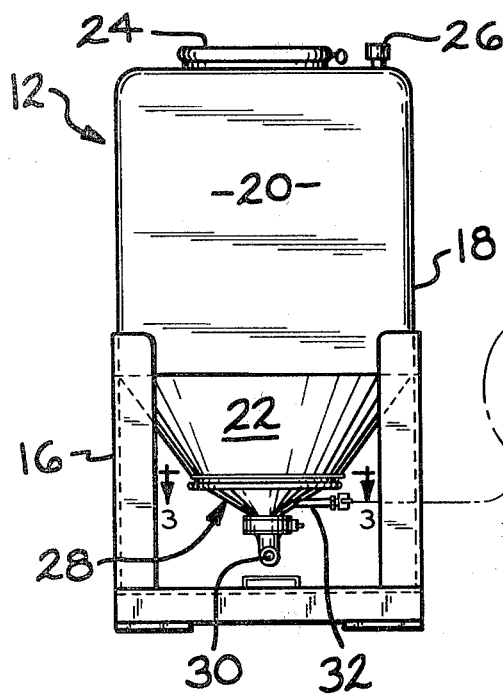
FIG. 1 is a front vertical elevational view of a fluidized bed discharge bin with aerating blower embodying principles of the present invention.

FIG. 1 shows a complete system 10 embodying principles of the present invention. The system comprises a bin 12 and a station 14 which supplies aerating fluid to the bin.

Bin 12 comprises a frame structure 16 supporting a bin chamber 18. The bin chamber comprises a main bin portion 20 having at its bottom a hopper portion 22 to facilitate discharge of the bin contents. A top cover 24 is removably secured to an opening in the bin chamber 18 via which the bin is filled. A fitting 26 in the top of chamber 18 provides for connection to a filter for filtering aerating fluid before discharge to atmosphere.

A fluidizing cone assembly 28 is disposed at the bottom of hopper portion 22, and includes a discharge outlet 30 via which the bin contents are discharged. An aerating fluid inlet 32 is provided in the sidewall of assembly 28 and is connected to station 14 to receive pressurized aerating fluid for fluidizing the bin contents.

Station 14 comprises a base 34 on which are mounted an electric motor 36, a blower 38, and an accumulator tank 40. Associated with motor 36 is a motor control panel 42 which contains electrical controls for operating motor 36. A drive belt 44 couples the motor output sheave to an input sheave of blower 38 whereby the blower is driven by the motor when the controls at the motor control panel are turned on. Motor 36 may be a conventional AC induction motor, and the electric motor controls are also conventional.

The flow path of the aerating fluid comprises an inlet filter assembly 46 covering an inlet pipe section 48 which leads to blower 38. Blower 38 draws ambient air via assembly 46 and pipe section 48 and delivers pressurized air via an outlet pipe section 50. Pipe section 50 includes a tee 52 for the accumulator tank 40 and leads to a pressure relief valve 54. Downstream of relief valve 54 is a butterfly-type control valve 56, and still further downstream, a pressure gauge 58. Pressure gauge 58 is connected via a hose line 60 to the aerating fluid inlet 32 of the bin. Control valve 56 is electrically controlled from a valve control panel 61.

If it is assumed for the moment that control valve 56 is closed when motor 36 is started, blower 38 will pressurize accumulator tank 40 until a pressure is reached which equals the setting of relief valve 54. When this setting is reached, any excess pressure is relieved by venting of the relief valve, or alternatively a pressure switch (not shown) may be interlocked with the motor control to shut the motor off. The pressure setting of relief valve 54 establishes the maximum pressure for the system and is utilized for the purpose of developing an initial surge in pressure to the bin when control valve 56 is initially opened.

Depending upon the characteristics of the particular bin construction and the particular bulk material in the bin, it may be desirable either to leave valve 56 open while the contents of the bin are being discharged or alternatively to intermittently open and close valve 56 during discharge. This latter mode of operation has been found to be particularly useful in avoiding the tendency of rat hole formation in the bin. The on-off intermittent operation of valve 56 individually by itself, and collectively in conjunction with the use of the accumulator tank and relief valve, has been found particularly beneficial. When valve 56 is operated in an intermittent on-off mode, the initial opening of the valve causes the full pressure which has been set by the relief valve to be applied to the line to the fluidizing cone 28. The size of the accumulator tank in relation to the size of the bin and the rating of the blower is such that the initial pressure upon opening of valve 56 represents an initial surge which subsequently tapers off to the nominal pressure developed by blower 38 alone provided that the valve is left open for a sufficiently long time. Regardless of whether the valve 56 is closed before nominal pressure is established, the provision of the intermittent mode of operation and the accumulator tank will provide an increased initial surge of pressure upon opening of valve 56 which is beneficial to fluidizing the contents of the bin in certain situations. For example, nominal pressure during continuous aeration may be two psi. By setting the relief valve to 10 psi, the difference of 8 psi represents the amount of extra stored energy released at the beginning of each on cycle.

The actual opening and closing of valve 56 may be done either manually or automatically in a desired timed relation. For this purpose the control panel 61 may include a manual-automatic selector switch to provide the desired mode of operation of valve 56. If the selector switch is in manual, the valve may be opened by the operator by using an on-off control switch to open and close the valve. Where the valve is operated in automatic mode, a conventional timer control circuit automatically opens and closes the valve at desired intervals. For example the valve may remain open for two seconds and then close for two seconds. The particular timing intervals are best determined on an empirical basis but generally are such that if an aerating bubble forms with-in the contents of the bin in response to initial pressurization, then control valve is closed to arrest the flow of aerating fluid before the bubble reaches the top of the bulk material and before the formation of a rat hole is completed. The valve should remain closed to allow the collapse of the bubble. The timer may provide adjustable on and off intervals.

Figure 3:
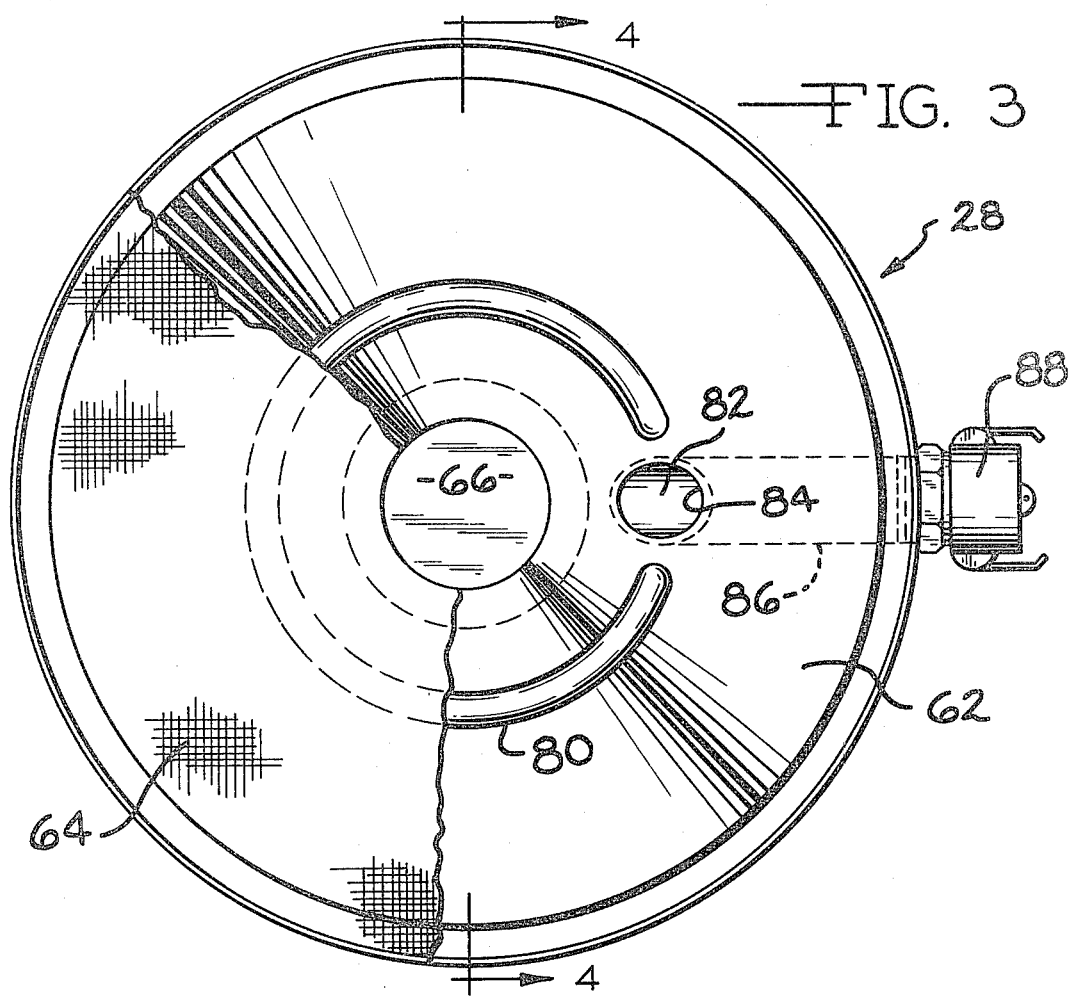
FIG. 3 is an enlarged horizontal sectional view taken in the direction of arrows 3—3 in FIG. 1.
Figure 4:
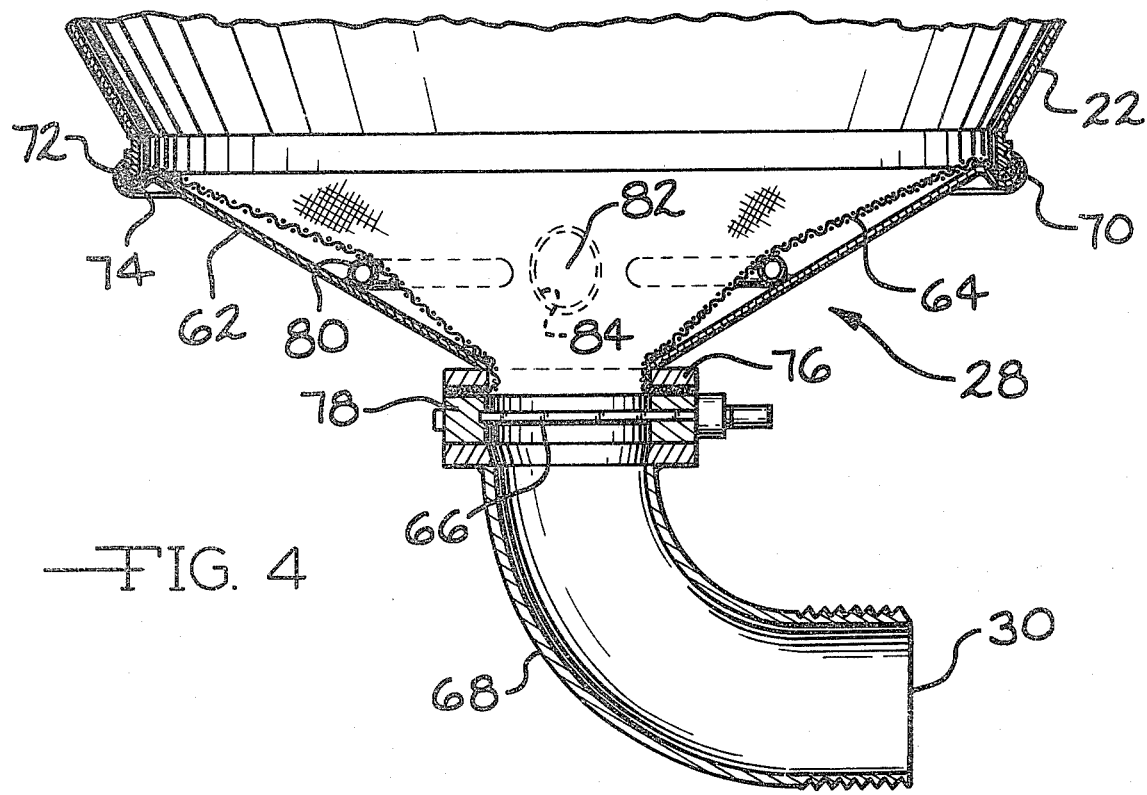
FIG. 4 is a vertical sectional view taken substantially in the direction of arrows 4—4 in FIG. 3.

Details of the fluidizing cone assembly 28 are disclosed in FIGS. 3 and 4. Assembly 28 comprises a generally flat, downwardly tapering, frusto-conical element 62, and air-permeable element, or sheet, 64, a discharge control valve 66 and an elbow 68 leading from valve 66 and providing the discharge outlet 30. Frusto-conical element 62 forms a closure for the circular opening at the bottom of hopper portion 22. A ring clamp 70 which extends circumferentially around the unit serves to removably secure the assembly 28 to the hopper portion. A circumferentially continuous beaded element having a bead 72 at its lowermost circumferential edge fits generally within a circumferentially continuous curled lip 74 which is provided around the upper periphery of the frusto-conical element 62. The ring clamp 70 serves to hold the lip 74 in engagement with bead 72 with the outer periphery of the air-permeable sheet 64 being retentively held between the two. The material of sheet 64 may be any suitable material but is often a fabric. In this manner the sheet itself not only is retained but also forms a sealing gasket between the fluidizing cone assembly and the bin to prevent leakage of particulate material within the bin between the joint defined between these two elements. The ring clamp is conveniently removable to facilitate assembly and disassembly of the fluidizing cone to and from the bin.

As can be seen in FIG. 4, sheet 64 is of annular shape and includes a central opening which aligns with a corresponding central opening at the bottom of element 62 where valve 66 is located. At this location there is a ring element 76 which, in cooperation, with a body element 78 of the valve provides for retention of the inner peripheral margin of sheet 64 as illustrated in the drawing figure. This method of retention provides a sealing gasket arrangement similar to that provided at the outer periphery of the fabric sheet by the mounting arrangement of the fluidizing cone on the bin.

Disposed on the generally flat interior surface of the frusto-conical element 62 is a spacer element 80 which is illustrated by way of example as having a circular tubular cross section. The spacer element may be secured to the frusto-conical element by any suitable means, for example as by welding. Spacer element 80 extends circumferentially around frusto-conical element 62, but not a full three hundred sixty degrees. This construction leaves a small gap 82 between free ends of the spacer element, which ends are preferably sealed and closed.

An inlet opening 84 is provided through element 62 at gap 82 to provide for the introduction of aerating fluid into the bin. An inlet tube 86 leads from opening 84 and terminates in a connector 88 to which the hose line 60 from station 14 removably attaches.

The drawing figures illustrate the fluidizing cone in a situation where the bin is empty. When the bin is filled with bulk material, the weight of the material will press the air-permeable sheet against the interior surface of frusto-conical element 62. The spacer element 80 however, prevents the air-permeable sheet from being pressed flat against the flat interior frusto-conical surface. It can be seen that the interior surface of element 62 provides an imperforate wall portion over the entire circumferential area except where inlet opening 84 is located. Hence, the inlet is located immediately adjacent the imperforate area and in the vicinity of the spacer element 80. The introduction of aerating fluid into the bin at the inlet opening 84 means that aerating fluid is introduced in close proximity to where the spacing means is spacing the air-permeable sheet from the generally flat interior surface of the frusto-conical element.

The operation of the system is such that aerating fluid is introduced into the bin to fluidize the powder or particulate material contents of the bin. In its fluidized form the material is readily flowable through the comparatively small opening provided at the bottom of the fluidizing cone. When the contents are to be discharged, valve 66 is opened and the contents readily flow through the valve and the elbow 68 to the outlet 30. Typically a discharge hose or other conveyance will be connected to the discharge elbow, for example by a threaded fitting, and hence the elbow is shown to include a thread to accommodate such a fitting. Thus it will be appreciated that a substantially sealed construction has been provided which greatly minimizes, or even completely eliminates dusting of bulk materials to atmosphere.

Figure 2:
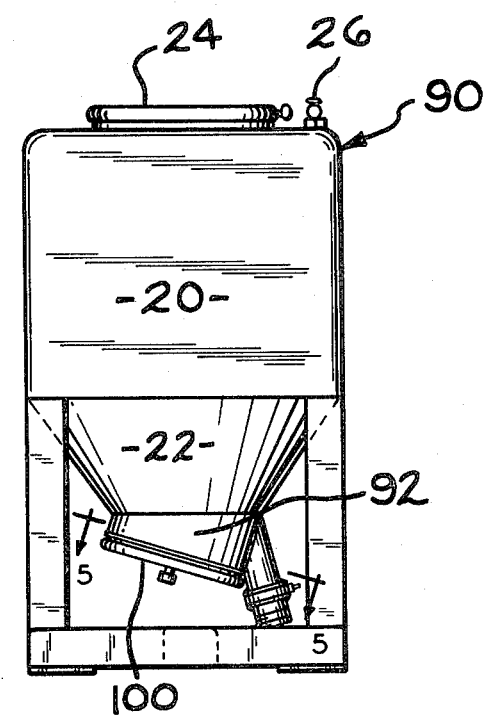
FIG. 2 is a front vertical elevational view of another embodiment of discharge bin.
Figure 5:
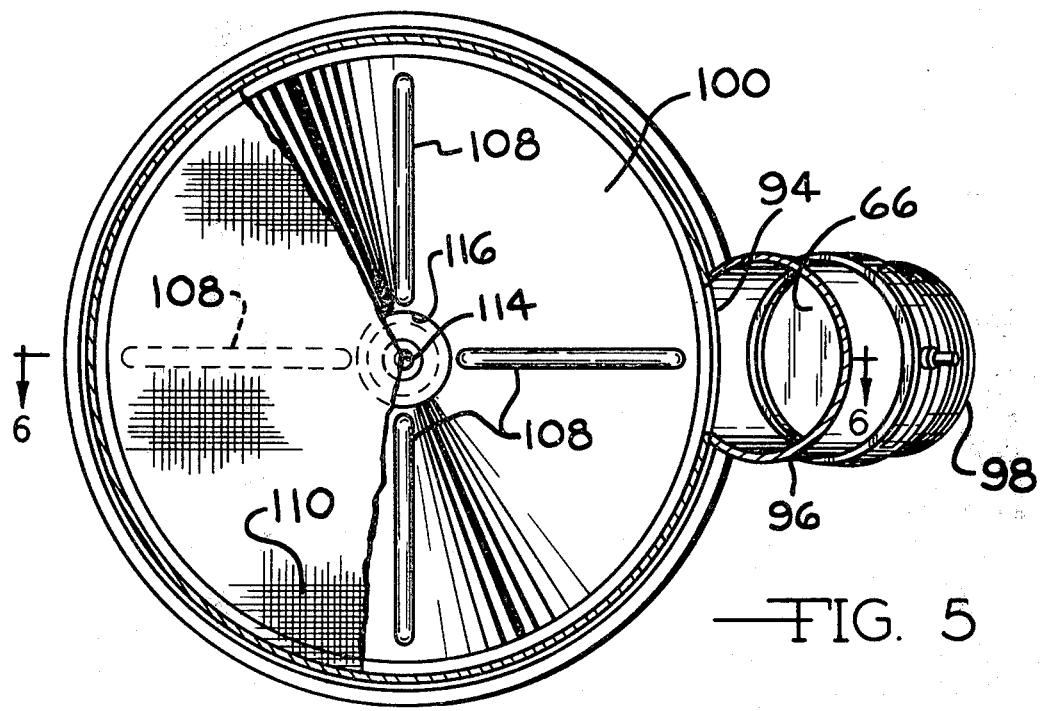
FIG. 5 is an enlarged sectional view taken in the direction of arrows 5—5 in FIG. 2.
Figure 6:
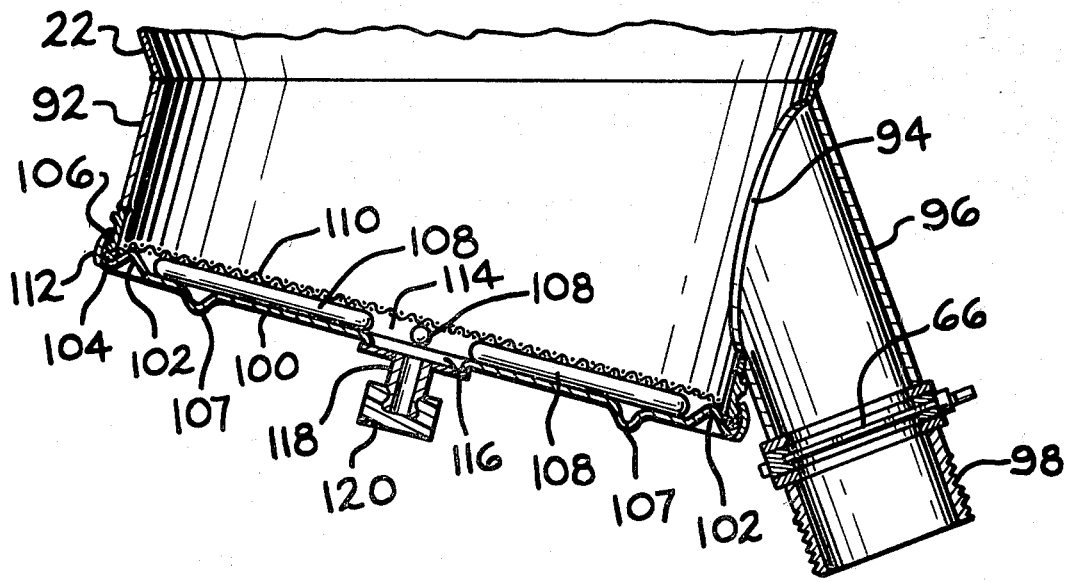
FIG. 6 is a vertical sectional view taken substantially in the direction of arrows 6—6 in FIG. 5.

FIGS. 2, 5, and 6 illustrate a second embodiment of the present invention comprising a bin 90. The station 14 with which bin 90 is used is identical to the station 14 described for the first embodiment, and hence a description thereof is not repeated. Bin 90 differs from bin 12 in that the structure at the bottom of the bin provides a further embodiment of aerating structure. In bin 90, at the bottom of the hopper portion 22, there is provided a hopper extension 92 which is of a generally cylindrical shape. However, the axis of the cylindrical extension 92 is disposed at an angle to the vertical with the top of the section being truncated at an angle to mate with the circular opening at the bottom of hopper portion 22. An aperture 94 is provided in the sidewall of hopper extension 92, as best seen in FIGS. 5 and 6, and a sidedischarge tube 96 is secured in sealed relation to the hopper extension around aperture 94. The discharge control valve 66 is disposed between discharge tube 96 and a straight threaded pipe outlet 98 to provide a side discharge for the bin as distinguished from the bottom discharge provided by the first embodiment.

A generally flat, planar, circular cover 100 forms the closure for the otherwise open bottom of the hopper extension 92 and includes a peripheral ridge 102 projecting inwardly of the bin and extending circumferentially continuously around the cover. A curled circumferentially continuous lip 104 is fashioned around the outside of ridge 102 to mate with the beaded free edge 106 of the bottom opening of the hopper extension. If necessary, provision may be made for stiffening the cover, as by adding stiffening beads 107.

Disposed on the generally flat interior surface of cover 100 are a plurality of radially directed spacer elements 108. The spacer elements 108 correspond to the spacer element 80 of the first embodiment and are in the form of tubular elements whose ends are closed and sealed. The illustrated array has the spacers disposed at 90° intervals with the spacers stopping short both radially inwardly and radially outwardly of the center and the periphery respectively of cover 100. An air-permeable member, or sheet, 110 overlies cover 100 within the hopper extension and has its outer periphery retentively held between the curled lip 104 of the cover and the bead 106 of the hopper extension. The cover 100 and air-permeable member 110 are releasably held in assembly by the removable retention band member, or ring, 112.

By the construction and arrangement of the individual spacer elements 108, a gap 114 is provided between the radially inner ends of the spacers. A circular opening 116 is fashioned in cover 100 centrally along the central inclined axis of the hopper extension and is closed by a nipple assembly 118. The drawing discloses the free end of the nipple assembly covered by a removable cap 120; in use cap 120 is removed and the nipple is connected to station 14 via hose line 60 to receive aerating fluid which is injected through the nipple assembly into the gap 114 defined between the radially inner termini of spacers 108. As in the first embodiment, the spacer elements 108 preclude the overlying air-permeable sheet 110 from being pressed flat against the generally flat interior surface of cover 100.

In operation aerating fluid is introduced via the inlet to fluidize the contents of the bin. When valve 66 is open the contents are allowed to flow out the side discharge to be delivered to the desired location.

Figure 8:
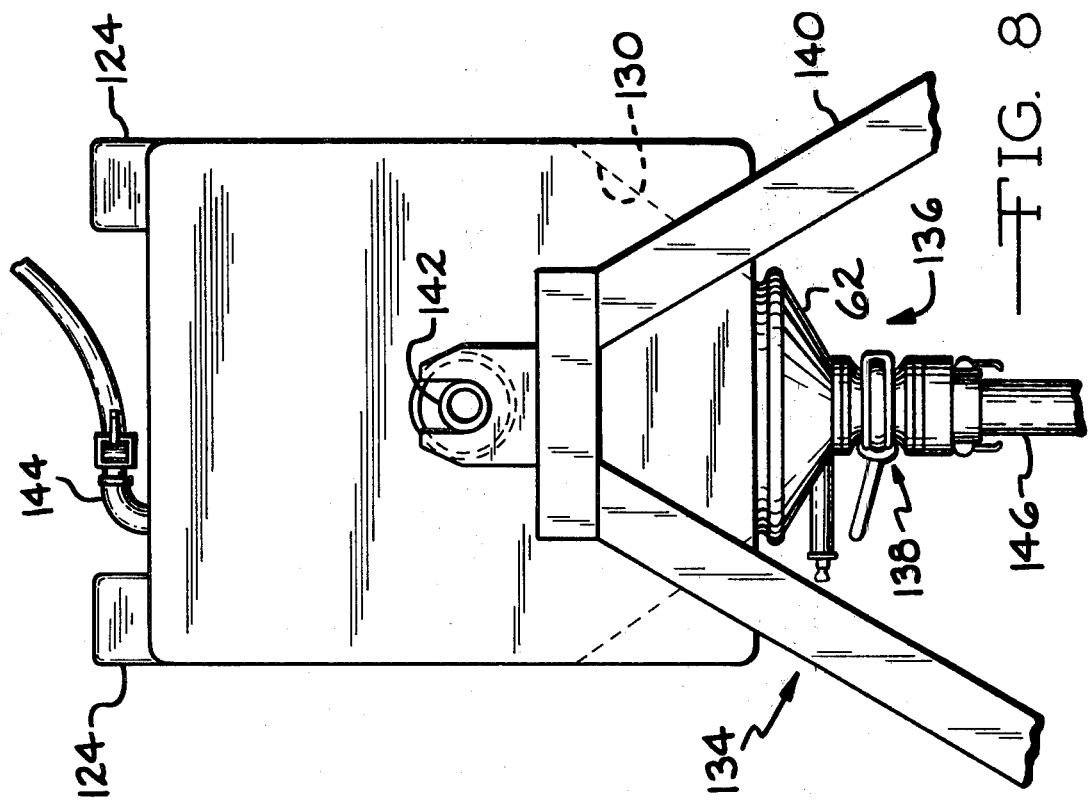
FIG. 8 is a side vertical elevational view illustrating the bin of FIG. 7 in use pursuant to the invention.
Figure 7:
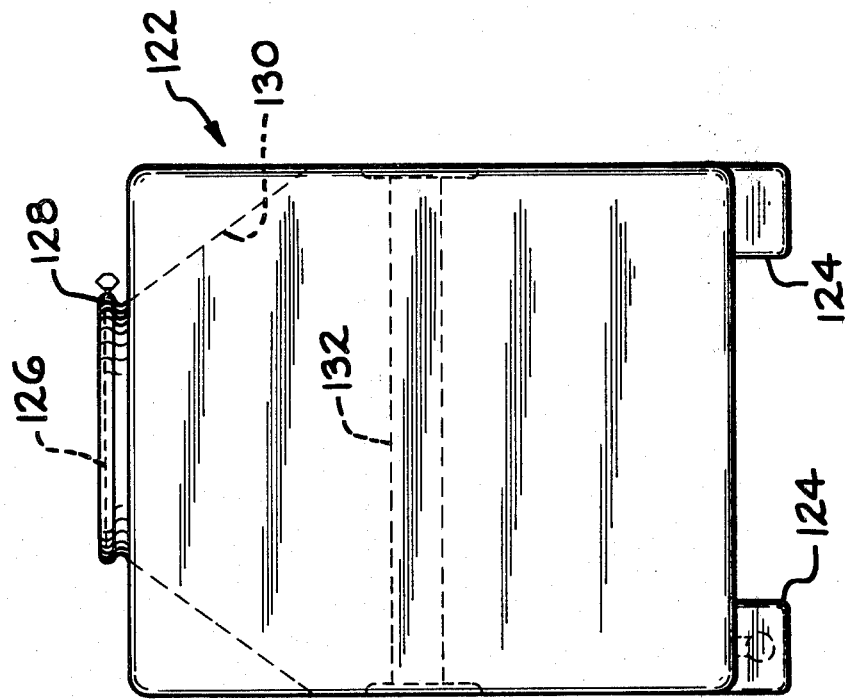
FIG. 7 is a front vertical elevational view of another type of bin relating to another aspect of the invention.

FIGS. 7 and 8 should be considered together for and represent a further aspect of the present invention. FIG. 7 illustrates an example of a central axis rotational bin 122. The bin is of generally rectangular overall configuration and is shown in the upright position. The bin includes a suitable base structure 124 for supporting the weight of the bin and its contents. In the illustrated embodiment the base comprises four feet at the four corners of the bin, but may be of other construction. The top of the bin includes a circular opening 126 which is shown to be enclosed by a removable cover 128. The bin also includes an internal hopper 130. Extending centrally through the interior of the bin between the two opposite sidewalls is a tube 132.

In use, the bin is filled via opening 126, cover 128 being removed. After the bin has been filled, the cover is placed over the opening, and the bin and its contents may be shipped. This would represent the condition of the bin at the time it is received at a location where it is to be emptied.

FIG. 8 illustrates the preferred procedure utilized for emptying the contents of the bin at a discharge station 134. The procedure involves first removing cover 128, and next, with the bin still in the upright position mounting a fluidizing cone assembly 136 on the bin over opening 126. The fluidizing cone assembly is similar to that shown in FIGS. 3 and 4. One difference, however, is that instead of the butterfly valve shown in those earlier drawing figures, the fluidizing cone assembly includes a manually operated pinch valve 138 at the outlet of the fluidizing cone shell 62. The discharge station includes a cradle structure 140 on which the bin 122 is placed. For this purpose a cylindrical pipe or similar member 142 may be passed through tube 132 prior to placing the bin on the cradle. The ends of the pipe protrude from the opposite sides of the tube 132 and provide the means by which the bin is supported on the U-shaped receptacles of the cradle.

With the bin in place on the cradle in a generally upright position, next step is to rotate the bin about the rod from the upright position. If the bin is rotated a full 180°, it assumes the position shown in FIG. 8. By rotating the bin in this manner, tightly-packed material in the bin may be broken loose before the fluidizing assembly is operated to fluidize the contents of the bin. The bin may include a vent fitting 144 which may be connected to a filter (not shown) and back to atmosphere. With the bin in the position of FIG. 8 the fluidizing assembly is operated with fluidizing air being introduced into the fluidizing cone. As a consequence, the contents of the bin are placed in a fluidized state, and when the pinch valve 138 is opened, the contents of the bin flow by gravity through the fluidizing assembly, the pinch valve, and a conduit 146 leading from the pinch valve. The internal hopper 130 is now in a position to be effective to facilitate discharge of the bin contents. When the bin has been fully discharged, the fluidizing assembly may be removed and the bin may be lifted from the cradle. The pinch valve is of the type comprising an elastomeric sleeve which is advantageous in preventing certain types of materials (clay or titanium dioxide)

from plating on the valve under severely throttled flow conditions.

An advantage of this aspect of the invention is that it is unnecessary for each bin to be equipped with its own fluidizing cone assembly. A single fluidizing cone assembly at the discharge station is all that is needed to empty a succession of bins of this type.

While specific examples of central axis rotational bin and discharge station have been disclosed, it will be appreciated that principles of the invention are applicable to other examples of bins and discharge stations. Also it should be pointed out that the fluidizing assembly could be mounted on the bin after the bin has been placed on the cradle instead of before.

In addition to the improved features of the invention as heretofore described, the invention provides unique solutions to material-handling problems and possesses a high degree of versatility in this regard. The invention allows complete and dependable discharge of finely divided powders or particulates, for example clay, cocoa, flour, cement, pharmaceutical products, pigments, etc. It utilizes a relatively small discharge port which is easily attached to a variety of conveying, metering, and processing devices. The small port is also relatively easily sealed, thereby rendering the delivery of powdered products more dust-free to the outside environment. Also the discharge arrangement can be quickly disconnected from and reconnected to a variety of conveying, metering and process devices. Such devices include an SCR motor driven auger which allows precise volumetric delivery where the bulk product has been aerated to a uniform density. A pneumatic type conveyor may be used to allow delivery to areas restricted by head room or lack of isle space; alternatively a screw auger may be used in place of a pneumatic conveyor to make possible delivery to elevated positions. Subtract weighing for batching operations can be accomplished by discharging the contents while the bin is on a scale. If a rotary valve is located within the unload station, precise control of product discharge is readily facilitated into conventional dilute phase or high-pressure dense phase pneumatic systems. A vibratory feeder with a belt scale could be incorporated into an unloading station for extremely accurate gravametric metering. Short dilute phase pneumatic systems can be accomplished with a regenerative blower and an ejector (aspirator) hook-up to the bin. Dense phase pneumatic conveying can be done with a double-diaphragm air-operated pump and an air entraining valve.

A specific example of an embodiment may utilize seven to ten SCFM aerating fluid per square foot of air-permeable material at $\frac{1}{2}$ to 3 psi. For intermittently pulsing the bin with repetitive pulses of aerating fluid, the pressure can be increased up to 20 psi and pulsed for two seconds on, two seconds off. A suitable air-permeable material is $\frac{3}{8}"$ thick polyester woven fabric.

The foregoing discloses a new and improved fluidized bed discharge bin with aerating blower possessing significant advantages over previous arrangements. While specific embodiments have been disclosed, they should be considered representative of the invention whose scope is set forth in the following claims.

What is claimed is:

1. In a fluidized bed discharge bin including an aerating blower, the improvement which comprises a removable closure covering an opening in the bottom of the bin, said closure comprising a frusto-conically shaped element converging generally downwardly to terminate in a central discharge outlet opening via which the fluidized contents of the bin are discharged, an air-permeable member within the bin overlying said closure and having a perimeter retentively held between said closure and said bin opening, said air-permeable member including a central aperture in alignment with said central discharge outlet opening and through which the fluidized contents of the bin pass during discharge, that portion of said air-permeable member surrounding its central aperture being secured with respect to said frusto-conically shaped element around said central discharge outlet opening thereof, spacing means disposed on that surface of said closure which is on the interior of the bin and engaging that side of said air-permeable member facing said closure at selected locations to space at least portions of said air-permeable member away from said interior surface of said closure, and an inlet in said closure at which aerating fluid is introduced to fluidize the contents of the bin for discharge, said spacing means extending circumferentially with respect to said frusto-conically shaped element less than a full three hundred sixty degrees thereby leaving a gap between its circumferential ends, said inlet being disposed in said frusto-conically shaped element at the same vertical level as said spacing means and being circumferentially located at said gap.

2. In a fluidized bed discharge bin including an aerating blower the improvement which comprises a removable closure covering an opening in the bottom of the bin, said closure comprising a generally circularly shaped element having a generally flat interior-facing surface, an air-permeable member within the bin overlying said closure and having a perimeter retentively held between said closure and said bin opening, said air-permeable member overlying the full extent of said interior-facing surface of said closure, spacing means disposed on that surface of said closure which is on the interior of the bin and engaging that side of said air-permeable member facing said closure at selected locations to space at least portions of said air-permeable member away from said interior surface of said closure, and an inlet in said closure at which aerating fluid is introduced to fluidize the contents of the bin for discharge, said inlet being located in close proximity to a location where said spacing means is spacing said air-permeable member from said interior surface of said closure, said spacing means comprising a plurality of circumferentially spaced, radially-directed spacing elements disposed on said interior-facing surface of said closure and extending thereon in a radial sense, which stop short of a central region of said generally circularly shaped element to thereby define a gap between the radially inner ends of the spacing elements and wherein said inlet is disposed in said generally circularly shaped element at said gap.

3. The improvement set forth in claim 2 wherein said generally circularly shaped element is disposed at a non-perpendicular angle to the vertical and the discharge bin comprises a discharge outlet tube disposed at one side of the bin and intercepting the bin vertically above the level of said air-permeable member.

4. In a fluidized bed discharge bin including an aerating blower the improvement comprising a removable closure covering an opening in the bottom of the bin, said closure including an imperforate wall portion having a generally flat planar interior surface on which the weight of overlying contents of the bin is supported, and an air-permeable sheet within the bin overlying said generally flat interior surface of said imperforate wall portion and having a perimeter retentively held between said closure and said bin opening, spacing means within the bin disposed on said interior surface of said imperforate wall portion and engaging that side of said air-permeable sheet facing said interior surface to preclude the entirety of said air-permeable sheet from being pressed flat against said interior surface, and means for introducing aerating fluid from the blower into the bin via an inlet in said closure which is located immediately adjacent said imperforate wall portion, said inlet being located at a central region of said closure and said spacing means comprising a series of spacing elements circumferentially spaced and directed generally radially with respect to the central region of said closure.

* * * * *